United States Patent
Doty et al.

(10) Patent No.: US 6,213,754 B1
(45) Date of Patent: *Apr. 10, 2001

(54) APPARATUS FOR MANUFACTURING CONCRETE MASONRY UNITS

(76) Inventors: Steven Everett Doty, #18, Brittany Woods Rd., Charleston, WV (US) 25314; Robert Jeffry Maddy, Rte. 2, Box 34A, St. Albans, WV (US) 25177

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,252

(22) Filed: Sep. 30, 1997

Related U.S. Application Data

(62) Division of application No. 08/654,576, filed on May 29, 1996, now Pat. No. 6,030,446.

(51) Int. Cl.$^7$ ................ B28B 3/04; B29C 31/06
(52) U.S. Cl. ............... 425/219; 249/112; 425/260; 425/448
(58) Field of Search ............. 249/112; 425/219, 425/258, 260, 448

(56) References Cited

U.S. PATENT DOCUMENTS

| | | | |
|---|---|---|---|
| 1,268,226 | * 6/1918 | Flood | 425/219 |
| 3,555,983 | * 1/1971 | Swisher, Jr. et al. . | |
| 3,961,973 | 6/1976 | Jones . | |
| 4,040,852 | 8/1977 | Jones . | |
| 4,058,406 | 11/1977 | Raponi . | |
| 4,210,457 | 7/1980 | Dodson et al. . | |
| 4,369,153 | * 1/1983 | Nash et al. | 425/219 |
| 4,741,782 | 5/1988 | Styron . | |
| 4,836,762 | * 6/1989 | Davis, Jr. | 425/448 |
| 5,076,985 | * 12/1991 | Koch et al. | 425/219 |
| 5,219,591 | * 6/1993 | Allison et al. | 425/260 |
| 5,358,760 | 10/1994 | Furlong et al. . | |
| 5,503,546 | * 4/1996 | Aaseth et al. | 425/260 |

* cited by examiner

Primary Examiner—James P. Mackey
(74) Attorney, Agent, or Firm—Steptoe & Johnson PLLC

(57) ABSTRACT

A cementitious composition for the molding of ultra-lightweight, durable, large structural units comprising Portland cement, coal combustion byproducts, expanded or extruded polystyrene and water, and a modified block machine used in the manufacture of such structural units.

10 Claims, 3 Drawing Sheets

APPARATUS FOR MANUFACTURING CONCRETE MASONRY UNITS

This application is a division of application Ser. No. 08/654,576, filed May 29, 1996, now U.S. Pat. No. 6,030,446.

BACKGROUND OF THE INVENTION

1. Field of the Invention

The present invention relates to cementitious compositions comprising Portland cement, coal combustion byproducts, expanded or extruded polystyrene, and, optionally, fiber. The invention further embraces lightweight structural units such as concrete masonry units (hereinafter "CMUs") produced from the cementitious composition of the present invention and a block machine used for preparing CMUs from the cementitious composition. The CMUs are used in the mining and construction industries.

2. Description of the Prior Art

It is well known in the mining industry to use CMUs to seal off areas in an underground mine which are not in use, and to direct the flow of air in areas which are in use, for the purpose of controlling ventilation in the mine. It is also well known to use structural units, such as CMUs, in the construction industry for the fabrication of masonry structures and the like.

Cementitious compositions used in the past to produce CMUs include combinations of Portland cement; coal combustion byproducts; sand, limestone and other aggregates; and water. These CMUs typically have a density ranging from 75 to 130 pounds per cubic foot, and have dimensions of approximately 8"×8"×16".

CMUs manufactured from these compositions are traditionally manufactured using one of two processes, typically depending on the water content of the mixture: (1) the block machine process, when the water content of the mixture is low (a mixture with low water content, i.e. from 0.01 to 5 gallons of water per cubic foot of dry mixture, is typically referred to as having a "low slump"), and (2) the "wet-pour" process, when the water content of the mixture is high (a mixture with high water content, i.e. from 5 to 10 gallons of water per cubic foot of dry mixture, is typically referred to as having a "high slump"). The manufacturing process utilizing the block machine, such as a Besser Block Machine, Model No. V312, includes feeding the cementitious composition into a mold, applying pressure and vibration while the composition is in the mold, extracting the resulting product from the mold and kilning and/or drying the product. Certain traditional CMUs must be manufactured using the "wet-pour" process due to the high slump of the cementitious composition used in the manufacture of such CMUs. The "wet-pour" process includes pouring the cementitious composition into a mold and, while still in the mold, kilning and/or drying the product. This latter process is more time consuming than the block machine process and requires the use of a number of molds during the manufacturing process. While a block machine requires an extensive start-up cost, ultimately the block machine process is less expensive and more efficient than the "wet-pour" process.

The CMUs produced from the traditional cementitious compositions described above are heavier than preferred for use in the mining industry. Preferably, the CMUs used in the mining industry are ultra-lightweight, i.e., having a density of from 25 to 45 pounds per cubic foot, and dimensions ranging in size from 6"×16"×24" to 8"×16"×24". A cementitious composition used in the past to produce such ultra-lightweight CMUs comprises Portland cement, coal combustion byproducts, soap bubbles and water. Due to the introduction of soap bubbles into the composition, the composition necessarily has a high water content, and therefore a high slump, to incorporate and maintain the soap bubbles. As a result, these ultra-lightweight CMUs must be manufactured using the "wet-pour" process described above, and therefore the resulting CMUs must dry for an extended period of time while still in the molds, which is more expensive and more time consuming than is the use of the block machine.

The ultra-lightweight CMUs produced from a cementitious composition comprising soap bubbles also tend, when subjected to certain environmental conditions (such as low humidity, vibration, foam density, and high heat), to lose their shape and to vary in sine and density. Furthermore, the prior art ultra-lightweight CMUs tend to break and crack during their manufacture, shipment and/or installation.

Accordingly, there is a need in the art for a cementitious composition which can be used in a block machine for the manufacture of large and ultra-lightweight CMUs, which will maintain their shape (and thus size and density) and which are easily toolable with standard masonry tools, and which will not break or crack during their manufacture, shipment and/or installation.

Typically, a conventional block machine, e.g., the Besser Block Machine, Model No. V312, is used to manufacture CMUs using a cementitious composition. Block machines are well-known in the relevant arts and are commercially available. Furthermore, a conventional block machine comprises a number of well-known components working together in forming a CMU. Conventional block machines and their components are well known to persons of ordinary skill in the relevant arts. The different components of a conventional block machine and their function during the manufacturing process are as follows:

(1) A feed box drawer having a strike-off bar at one end is positioned over a mold box and receives a predetermined amount of a cementitious composition;

(2) Upon receiving the predetermined amount of cementitious composition, the feed box drawer traverses a pair of rails and passes over the mold box. As it passes over the mold box, the feed box drawer fills the mold box with the cementitious composition;

(3) Once the feed box drawer fills the mold box with the cementitious composition, the feed box drawer retracts along the rails such that the strike-off bar passes over the top of the mold box and levels, or screeds, the cementitious mixture in the mold box and removes any excess cementitious composition;

(4) After the feed box drawer has retracted, the stripper head lowers and cementitious composition in the mold box is compacted by means of vibration and pressure into a CMU; and (5) After the CMU is formed, the CMU is removed from the mold box on a production pallet.

These components of a conventional block machine and the operation thereof are described in several prior patents. For example, in U.S. Pat. Nos. 5,059,110 and 5,219,591 to Allison, et al. (collectively, the '591 Patent), an apparatus for forming concrete blocks is described having a feed drawer positioned over a mold box and having a strike-off plate, and tracks on which the feed drawer traverses when filling the mold box with a concrete material. These components operate in the conventional manner as described above. See '591 Patent, Col. 5, Lines 25–33, Lines 55–59; and Col 7, Lines 31–61.

In addition, other prior patents, dating as early as 1918, disclose these well-known principals of block machines. In U.S. Pat. No. 1,268,226 to Flood on Jun. 4, 1918 (the '226 Patent), a brick press is disclosed having a strike-off bar (See '226 Patent, Pg. 2, Lines 30–37), a feed drawer positioned over a mold box (See '226 Patent, Pg. 2, Lines 21–30, Lines 42–45), and tracks, called connecting rods, on which the feed drawer traverses over the mold box (See '226 Patent, Pg., Lines 21–23). These components are also illustrated on the figures. See '226 Patent, FIGS. 1, 4–6.

In U.S. Pat. No. 4,369,153 to Nash, et al. on Jan. 18, 1983 (the '153 Patent), a machine for casting concrete members is disclosed that also describes the general and well-known components of a conventional block machine. In particular, the disclosed machine incorporates a screed, or strike-off, plate for smoothing the surface of the concrete in an extruder or mold (See '153 Patent, Col. 7, Lines 47–50; Col. 8, Lines 1–6), a vertical alignment of a bin, or feeding drawer, over a mold (See '153 Patent, Col 4, Lines 29–36; Col. 6, Lines 22–26, Lines 59–63), and the use of rails (See '153 Patent, Col. 5, Lines 15–17). See also '153 Patent, FIGS. 1a–4.

SUMMARY OF THE INVENTION

Our invention is directed to cementations compositions comprising Portland cement, extruded or expanded polystyrene, coal combustion byproducts, water, and, optionally, fiber. Each element of the cementitious composition is present in an amount sufficient to form a low slump mixture.

The inclusion of expanded or extruded polystyrene in the cementitious compositions of the present invention allows for the manufacture of CMUs that are ultra-lightweight, have even consistency, maintain their shape (and thus size and density) and do not break or crack during their manufacture, shipment and/or installation. The inclusion of expanded or extruded polystyrene in the cementitious compositions of the present invention also allows for the preparation of CMUs without the use of a mold during the drying or curing process. Accordingly, instead of the "wet pour" process which must be used in the manufacture of ultra-lightweight CMUs from the prior art cementitious compositions, the present invention allows for the use of a block machine in the manufacture of CMUs from the cementitious composition of the present invention.

Additionally, we have found that if the traditionally used block machine is modified in the following manner, CMUs having a consistent shape, size and density can be manufactured. The traditional block machine may be temporarily modified by: (1) providing a raking device on the stike off bar, wherein the raking device has teeth with dimensions no greater than ½"×½" and which are spaced no more than ½" apart (so that said raking device does not pull a substantial amount of the cementitious composition mixture to the back of the mold when leveling the composition); (2) angling the front and back liners of the bed joint mold box inward 1°–5° from perpendicular (so that when the resulting product is removed from the mold, and naturally decompresses, the resulting CMU does not have a trapezoidal cross section (the pallet at the bottom of the CMU will hold the bottom of the CMU in a consistent shape until after the decompression of the polystyrene has dissipated)); and (3) providing a ramp on the feed box rail of the feed box drawer which, at its greatest height, is from ⅛" to ½" above said rail (in order to compensate for that portion of the mixture which is pulled to the back of the mold when the raked strike off bar passes over the mixture). While the head joint sides of the mold liners may also be angled in to create a true rectangular shape, this is typically not necessary (except for aesthetic purposes), as these edges are not critical to the stacking of structural units in mines or masonry structures.

DESCRIPTION OF PREFERRED EMBODIMENTS

Figure 1:
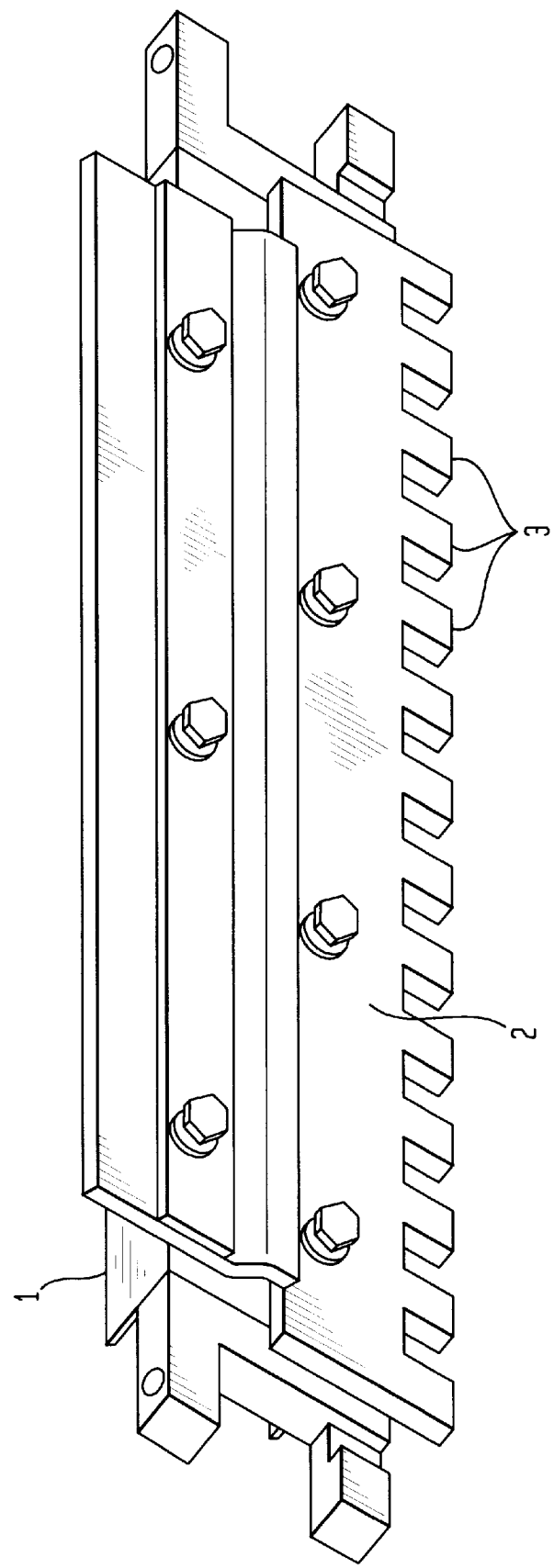
FIG. 1 is front view of the modified strike-off bar to be used in the block machine of the present invention.

The present invention encompasses cementitious compositions comprising Portland cement, expanded or extruded polystyrene, coal combustion byproducts, water and, optionally, fiber, each element being present in an amount sufficient to form a low slump mixture.

The most preferred Portland cement for use in the present invention is Type I Portland cement, due to its low cost. The cement is preferably present in the cementitious composition in an amount equal to about 50% to 70% of the total weight of the cement, coal combustion byproducts and polystyrene mixture (hereinafter "% of the total weight of the unsaturated mixture"). Most preferably, the Portland cement is present in an amount equal to about 60% to 65% of the total weight of the unsaturated mixture.

Suitable expanded polystyrene for use in the present invention is virgin expanded polystyrene, or ground or shredded expanded or extruded polystyrene, having an average diameter less than or equal to ⅜". Most preferable is the use of ground or shredded polystyrene because it provides a rougher surface which contributes to adherence and cohesiveness of the cementitious composition. The polystyrene regrind can be wholly comprised of polystyrene waste (e.g., waste from manufacturers of polystyrene products and/or from consumer polystyrene waste). Currently, such polystyrene waste is transported to landfills for disposal, and as a result solid waste authorities are a lucrative source for such polystyrene. Since the polystyrene shall be bound into the CMUs manufactured under the process set forth herein, post-consumer waste is a viable source for such polystyrene. Additionally, the use of waste polystyrene curtails the economic loss and environmental problems associated with the disposal thereof. The expanded or extruded polystyrene waste may be ground or shredded, for example, by a commercial regranulator, such as TSI Model 800. The amount of expanded or extruded polystyrene present in the compositions of the present invention is preferably about 3% to 10% of the total weight of the unsaturated mixture, and is most preferably about 4% to 5% of the total weight of the unsaturated mixture.

Suitable coal combustion byproducts for use in the cementitious compositions of the present invention include, for example, fly ash, bottom ash, stack dust, cinders, and ash with or without pyrates. The most preferred coal combustion byproduct is ultra-light bottom ash, having a density of less than forty pounds per cubic foot. Preferably, the amount of coal combustion byproduct present is about 25% to 50% of the total weight of the unsaturated mixture, and is most preferably about 34.5% to 36.5% of the total weight of the unsaturated mixture. However, the consistency of the coal combustion byproducts vary depending on the conditions in which they are created. Accordingly, the amount of each ingredient of the composition of the present invention may need to be optimized depending upon the particular byproduct used.

Preferably, about 0.01 to 5 gallons of water per cubic foot of the unsaturated Portland cement, expanded or extruded polystyrene, coal combustion byproducts, and, optionally, fiber mixture are present in the compositions of the present invention. Most preferably, about 0.09 to 0.125 gallons of water per cubic foot of said unsaturated mixture are present.

Optionally, fibers may also be included in the cementitious composition of the present invention in order to increase the durability of the CMUs produced from such compositions. Suitable fiber includes, for example, plastic fibrillated or nonfibrillated fiber, such as polypropyl-nylon, PET (polyethylene terephthalate), virgin polypropylene and other similar fibers (such as are commonly used in cementitious compositions). Most preferably, the fiber is virgin polypropylene or PET. Preferably, the fiber is present in an amount of about 0.1% to 5% by weight of total unsaturated mixture, and most preferably is present in an amount of about 0.1% to 2% weight of total unsaturated mixture.

The process utilized in preparing the cementitious composition may comprise mixing Portland cement, expanded or extruded polystyrene, coal combustion byproducts, water and, optionally, fiber at one time. Most preferably, however, the process includes the following steps:

(1) First, mixing for approximately 30 seconds predetermined quantities of polystyrene and fiber, if desired, and approximately one-half of the predetermined amount of water, at a rate of 5–10 gallons per minute, so that the polystyrene and fiber (if present) are "pre-wetted".

(2) Next, the predetermined quantities of Portland cement, coal combustion byproducts and the remaining water are added to the "pre-wetted" polystyrene (and fiber, if present) and the combination is thoroughly mixed as quickly as possible (approximately 30 seconds) in order to prevent cement and aggregate agglomeration. The cementitious composition is now ready for production of the end-use product, such as a CMU.

The process utilized for preparing the CMUs of the present invention comprises:

(1) placing the cementitious composition prepared by the processes outlined above in a mold;

(2) subjecting the composition to pressure and vibration similar to that produced by a Besser Block machine; and (3) removing the resulting product from the mold and curing the product either in standard room temperature and humidity conditions or, to accelerate the curing step, in an environment of up to 100% humidity and 190° Celsius.

The CMUs of the present invention may be manufactured using the block machine process described above. We have found that modifying a block machine, such as a Besser Block Machine, Model No. V312, in the following manner results in the manufacture of CMUs that consistently have advantageous physical characteristics.

First, as represented in FIG. 1, it is preferable to provide the strike-off bar (1) with a raking device (2) wherein the notched teeth (3) of the raking device have dimensions no less than ½"×½", and are separated by a space of no less than ½".

Figure 2:
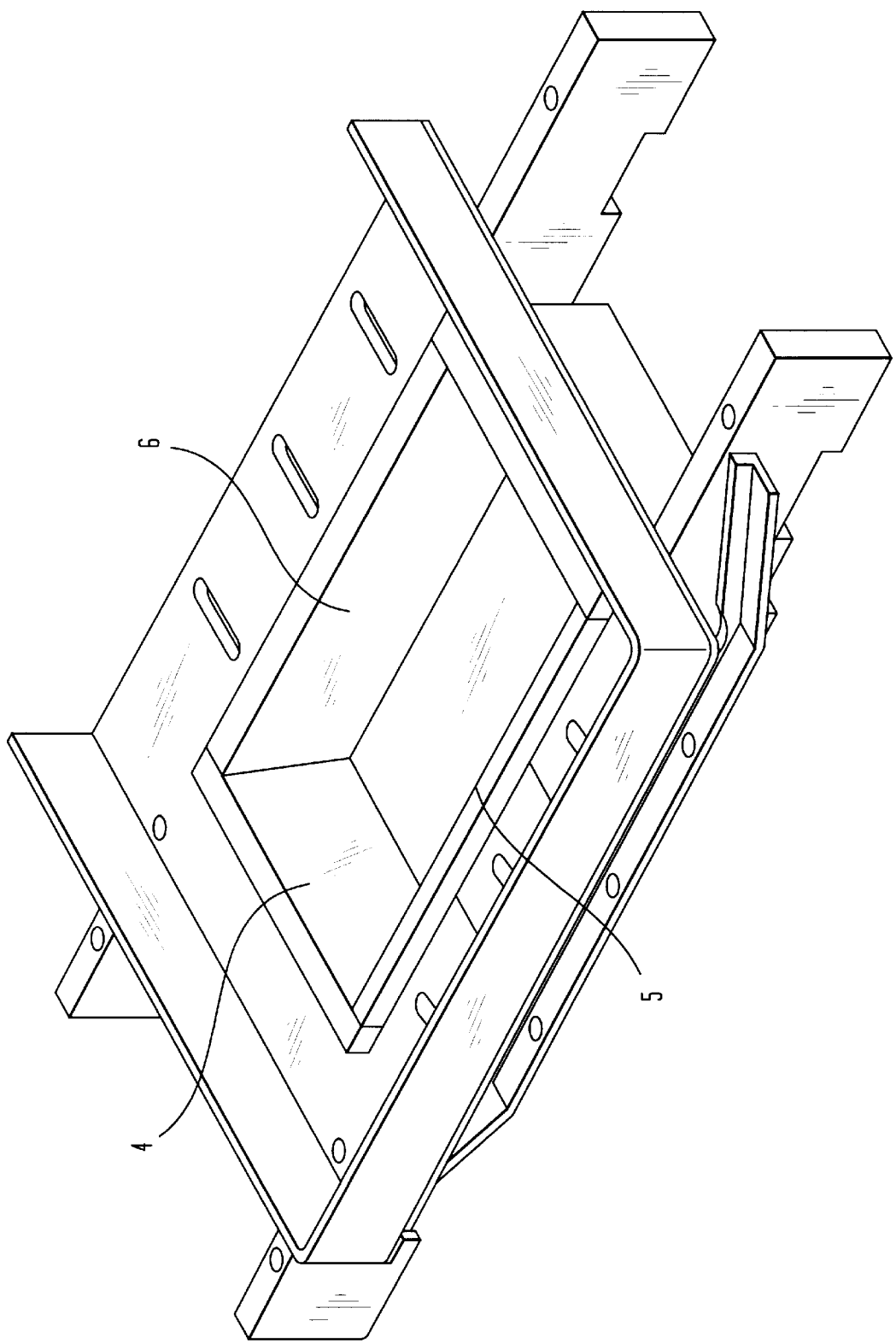
FIG. 2 is a top of the modified mold box to be used in the block machine of the present invention.

Second, as represented in FIG. 2, the front liner (5) and back liner (6) of the bed joint mold box (4) should be angled inward from 1° to 5° from perpendicular so that when the resulting product is removed from the mold, and naturally decompresses, the resulting product does not have a trapezoidal cross-section.

Figure 3:
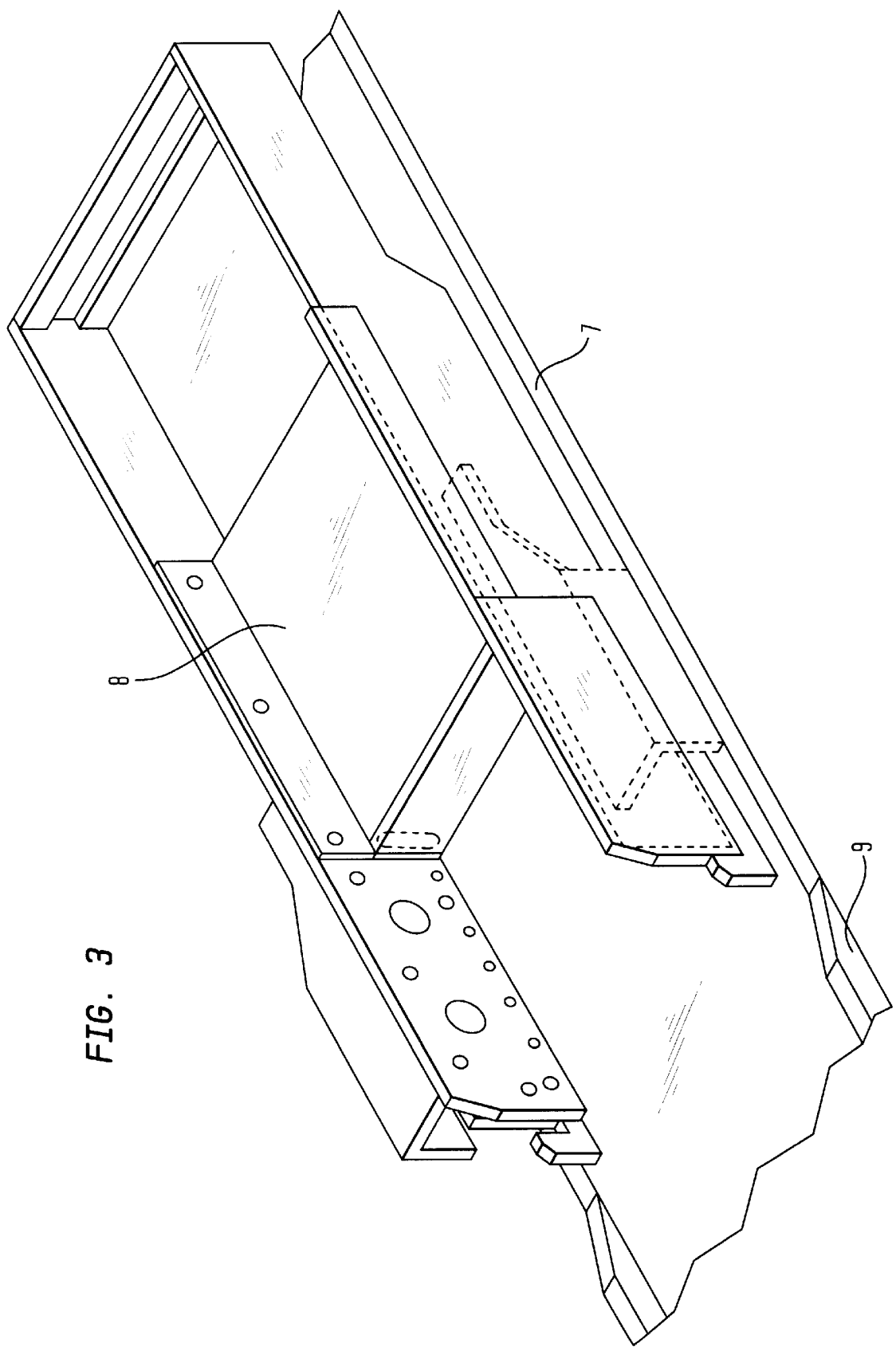
FIG. 3 is a side view of the modified feed box to be used in the block machine of the present invention.

Third, as represented in FIG. 3, the feed box rail (7) of the feed box drawer (8) should be modified to include a ramp (9) which, at its greatest height, is from ⅛" to ½" above said rail, allowing additional mixture to be filled at the front of the mold.

Each of these modifications, while they may be permanent to the actual elements of the machine, are temporary modifications to the entire machine and can be replaced with parts which do not have such modifications for the manufacture of traditional structural units.

We claim:

1. A strike-off bar for use with a feed box drawer and a mold box of a block machine used in manufacturing concrete masonry units from a cementitious composition, comprising:

an elongated bar having a bottom side, wherein said elongated bar is attached to the feed drawer such that said bottom side of said elongated bar passes over the mold box after the mold box is filled with the cementitious composition; and a raking device rigidly attached to said bottom side of said elongated bar, said raking device having a plurality of notched teeth, wherein one or more of said notched teeth are no less than about ½ of an inch by about ½ of an inch.

2. The strike-off bar according to claim 1, wherein two or more of said notched teeth are separated by no less than about ½ of an inch.

3. The strike-off bar according to claim 1, wherein said raking device is bolted to said bottom side of said elongated bar.

4. A raking device for use with a strike-off bar of a feed box drawer of a block machine used in manufacturing concrete masonry units from a cementitious composition, comprising:

an elongated bar having a plurality of notched teeth positioned on a bottom side, wherein one or more of said notched teeth are no less than about ½ of an inch by about ½ of an inch and two or more of said notched teeth are separated by no less than about ½ of an inch; and a means for attaching said elongated bar to the strike-off bar.

5. A mold box for use with a block machine used to manufacture concrete masonry units from a cementitious composition, comprising:

a front liner being angled inward about 1 degree to about 5 degrees from perpendicular;

a back liner being angled inward about 1 degree to about 5 degrees from perpendicular;

a first side liner connecting said front liner to said back liner; and a second side liner connecting said front liner to said back liner.

6. A feed box rail system for use with a feed box drawer and a mold box of a block machine used in manufacturing concrete masonry units from a cementitious composition, comprising:

one or more feed box rails having a ramp on one end, wherein the feed box drawer traverses said feed box rails in depositing the cementitious composition into the mold box resulting in additional cementitious composition being deposited into the front of the mold box as the feed box drawer rises on said ramp.

7. The feed box rail system according to claim 6, wherein said ramp has a height within the range of about 1/8 of an inch to about 1/2 of an inch.

8. A block machine for manufacturing concrete masonry units from a cementitious composition, comprising:
- a mold box having a front liner and a back liner being angled inward about 1 degree to about 5 degrees from perpendicular, wherein the cementitious composition is filled into said mold box resulting in a concrete masonry unit;
- a feed box drawer having a strike-off bar, said feed box drawer mounted above said mold box wherein said feed box drawer traverses over said mold box and deposits the cementitious composition into said mold box, wherein said strike-off bar has a bottom side and a raking device rigidly attached to said bottom side of said strike-off bar, wherein said raking device has a plurality of notched teeth, wherein one or more of said notched teeth are no less than about 1/2 of an inch by about 1/2 of an inch and are separated by no less than about 1/2 of an inch, and said raking device passes over said mold box and screeds excess cementitious composition rearwardly; and
- a pair of rails on which said feed box drawer traverses when filling said mold box with the cementitious composition, wherein said rails have a ramp on one end such that said feed box drawer fills additional cementitious composition into said mold box as said feed box drawer rises on said ramp of said rails.

9. The block machine according to claim 8, wherein said raking device is bolted to said bottom side of said strike-off bar.

10. The block machine according to claim 8, wherein said ramp has a height within the range of about 1/8 of an inch to about 1/2 of an inch.

* * * * *